June 12, 1945.  P. F. PRESTON  2,377,962
CEMENTING JIG
Filed March 12, 1942   6 Sheets-Sheet 1

Paul F. Preston   INVENTOR
BY J. M. Castle Jr.
ATTORNEY

Fig. 2-A

Paul F. Preston  INVENTOR

June 12, 1945.  P. F. PRESTON  2,377,962
CEMENTING JIG
Filed March 12, 1942  6 Sheets-Sheet 3

Paul F. Preston INVENTOR

BY  J. M. Castle Jr.
ATTORNEY

June 12, 1945.　　　P. F. PRESTON　　　2,377,962
CEMENTING JIG
Filed March 12, 1942　　　6 Sheets-Sheet 4

Paul F. Preston INVENTOR

BY J. M. Castle

ATTORNEY

June 12, 1945. P. F. PRESTON 2,377,962
CEMENTING JIG
Filed March 12, 1942 6 Sheets-Sheet 5

Paul F. Preston INVENTOR

BY

ATTORNEY

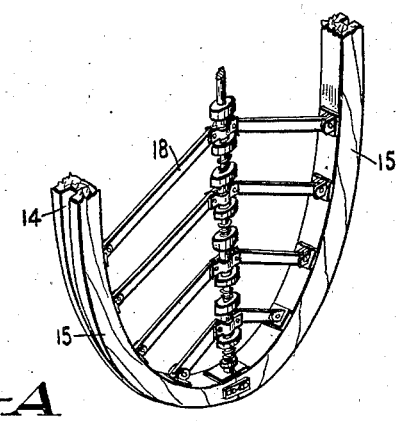
Fig. 6-A
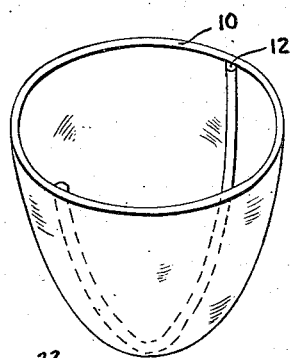
Fig. 6-B
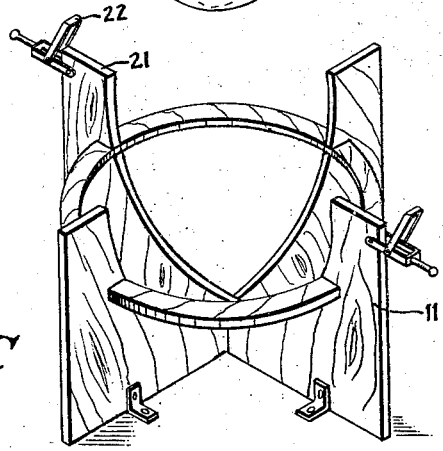
Fig. 6-C

Patented June 12, 1945

2,377,962

UNITED STATES PATENT OFFICE 2,377,962

CEMENTING JIG

Paul F. Preston, Newark, N. J., assignor to E. I. du Pont de Nemours & Company, Wilmington, Del., a corporation of Delaware Application March 12, 1942, Serial No. 434,331

5 Claims. (Cl. 154—1)

This invention relates to a cementing jig and, more particularly, to a pressure jig for cementing together curved mating parts of organic plastic material.

When shaped organic plastic sheet material is used as a substitute for glass in any large objects such as gun turrets, and cockpit enclosures and nose pieces for airplanes, the structures must usually be strengthened by ribs of like material cemented to the inside. From the standpoint of appearance as well as strength, it is required that the cemented joints be homogeneous and free from bubbles. To achieve a uniform joint any device for applying pressure in the cementing operation must effect a substantially equal distribution of pressure along the curvature of the joint. It must further be such as will not mar the cemented parts and, for speed in production, will permit of rapid manipulation.

It is an object of the present invention to provide a jig for applying and maintaining substantially uniform pressure upon curved structures while cementing them together. More particularly, it is an object to provide a pressure jig for forming continuous, bubble-free cemented joints between strengthening ribs and transparent plastic airplane structures. A further object is to furnish an easily manipulated jig for forming satisfactory joints between curved mating organic plastic parts without marring the material. Other objects will be apparent from the description of the invention given hereinafter.

These objects are accomplished by using a cementing jig employing the principle of a divided force positively directed along the curvature of the joint, in conjunction with a cooperating fixture, for applying and maintaining pressure in cementing mating curved surfaces together. The invention is concerned with a device in which the advancement of a central pressure element effects the lateral and forward displacement of a pair of expanding members in such a manner that the pressure causing the advancement is distributed substantially uniformly along the curved length of the expanding members.

In order that the invention may be more readily understood, reference is made to the accompanying drawings in which.

Figure 1:
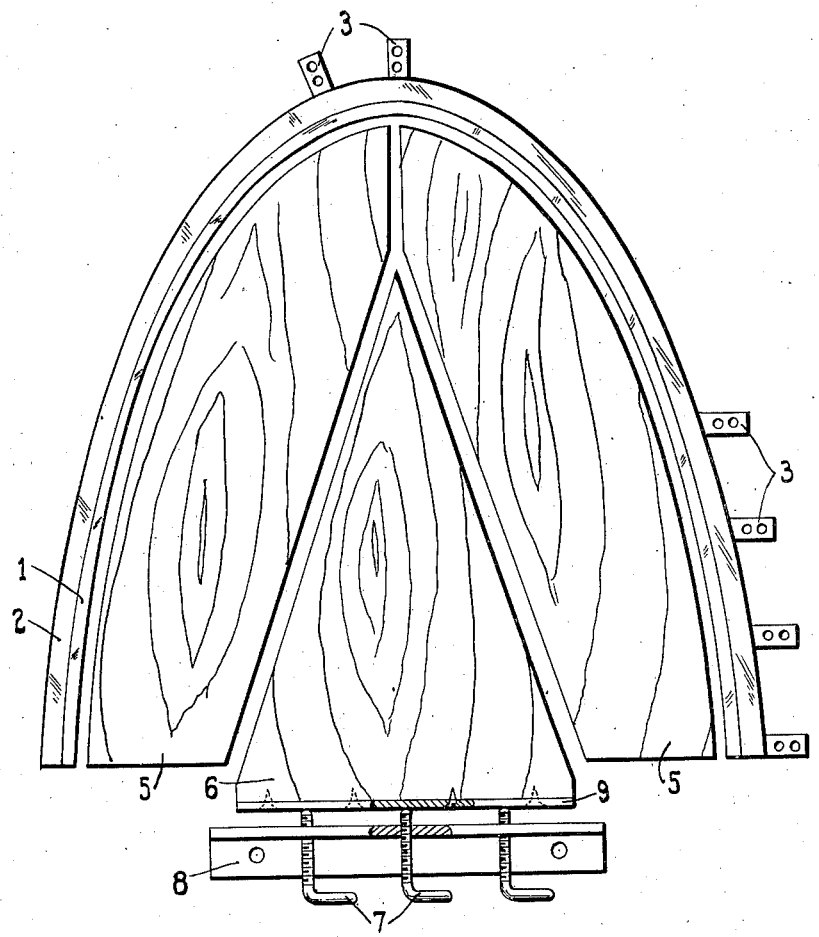
Fig. 1 is a plan view of a cementing jig, according to one embodiment of the invention, in operation in the cementing of a rib to one end of half an airplane nose piece.
Figure 2:
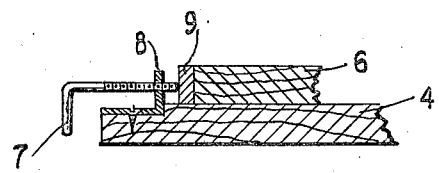
Fig. 2 is a front elevational view of the jig shown in Fig. 1.
Figure 2:
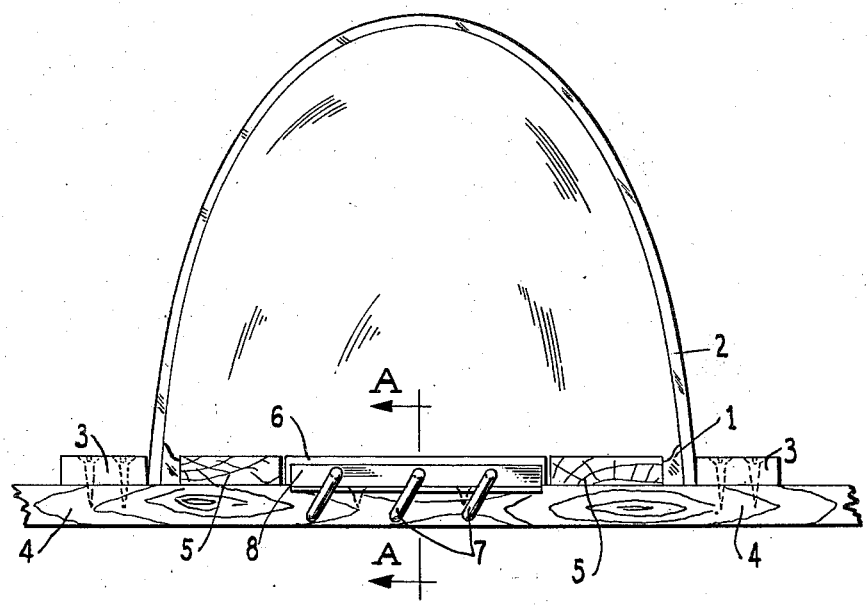
Figure 3:
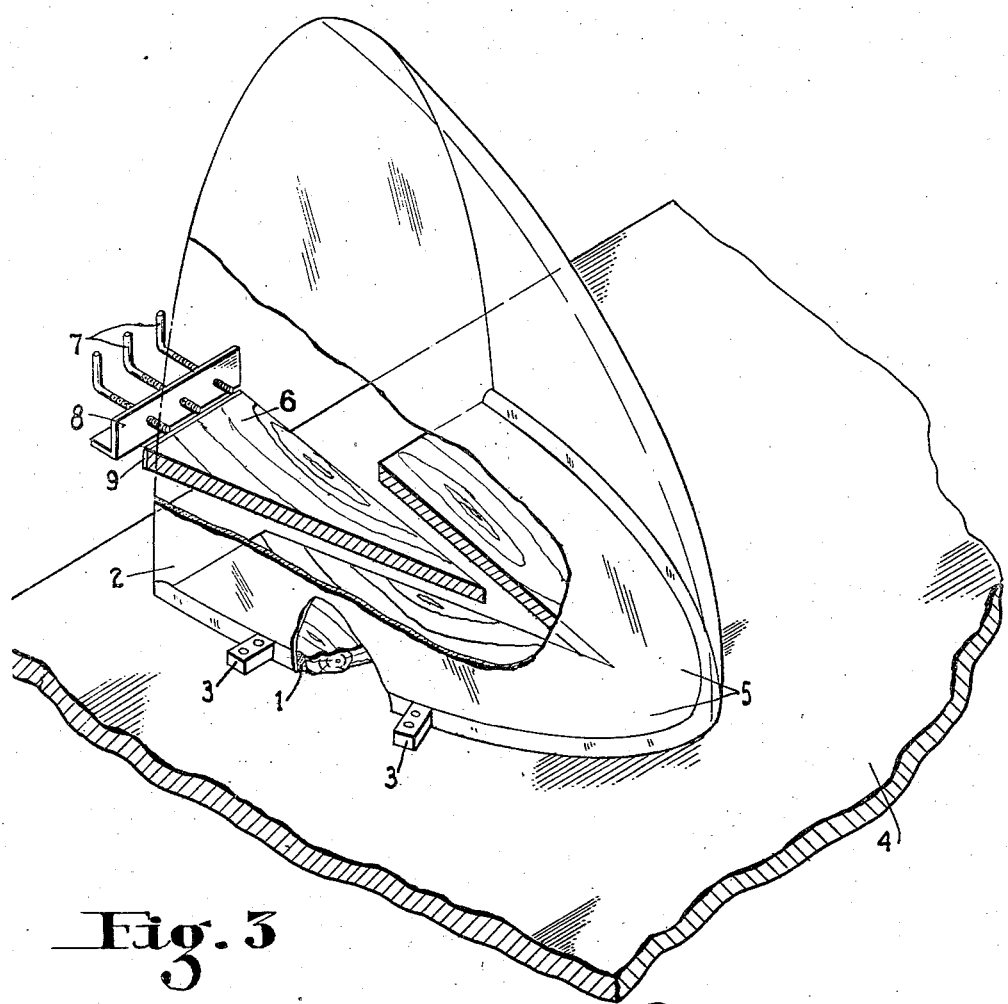
Figure 4:
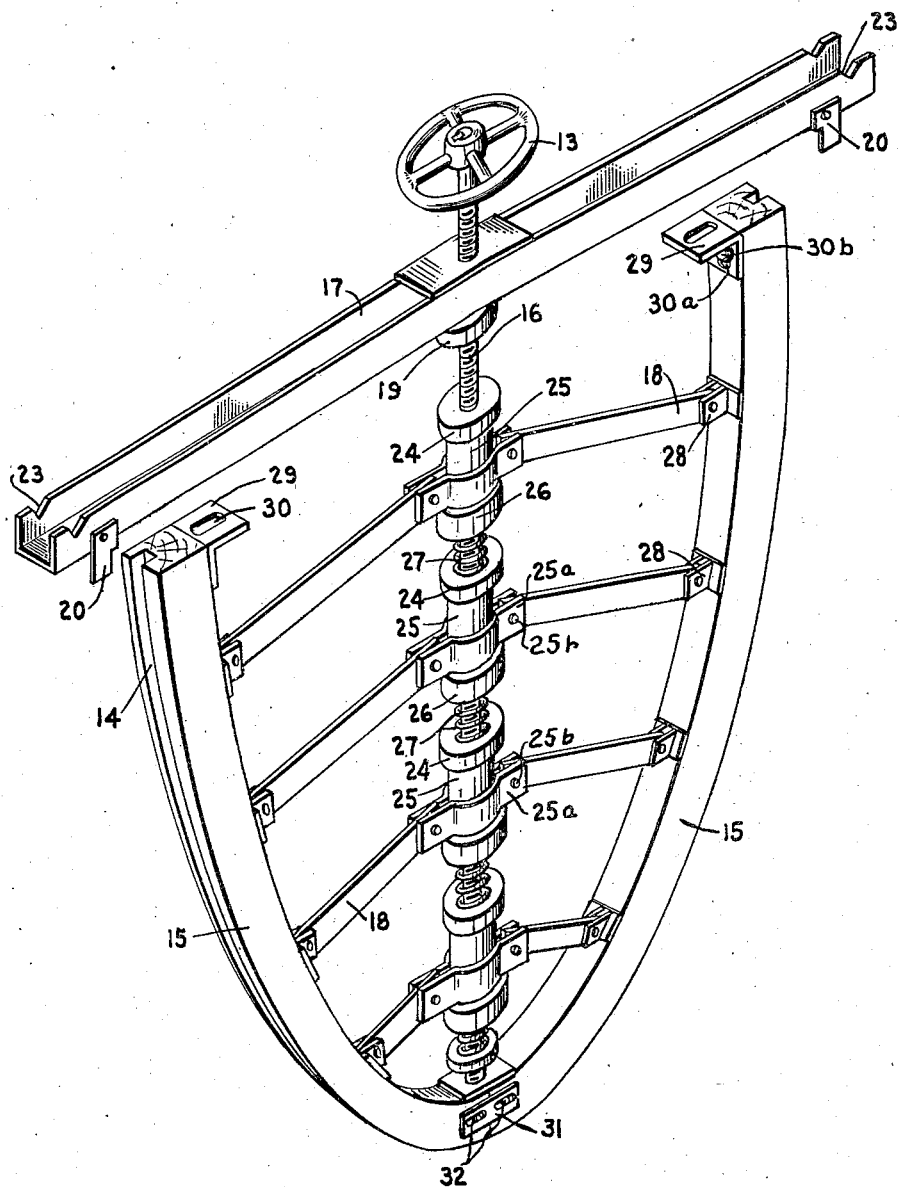
Figure 5:
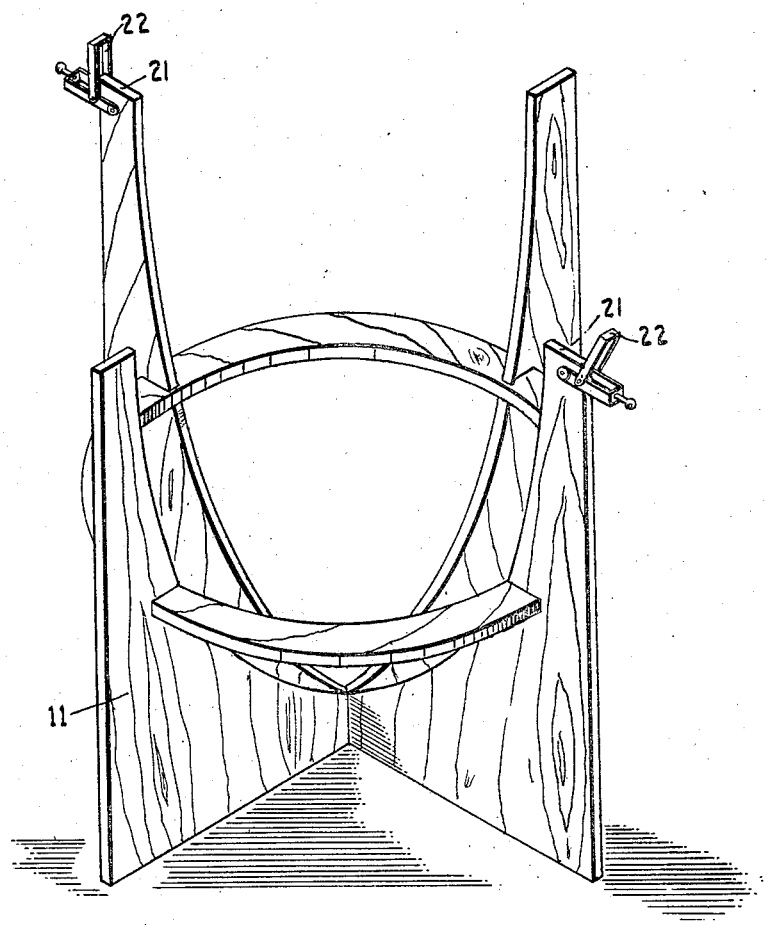

Fig. 2—A is a section along the line A—A in Fig. 2;

Fig. 3 is a diagrammatic perspective view of the jig shown in Figs. 1 and 2;

Fig. 4 is a perspective view of a cementing jig according to another embodiment of the invention;

Fig. 5 is a perspective view of a frame cooperating with the jig shown in Fig. 4; and Figs. 6—A, 6—B, and 6—C illustrate, in perspective, the operative relation of the jig shown in Fig. 4, and the frame shown in Fig. 5, to a rib and airplane shell to be cojoined.

Referring to Figs. 1, 2, 2—A and 3, a completely formed shell 2 of organic plastic material is placed upon the bench 4, within the stops 3, arranged along a curve corresponding to the bottom of the shell and securely fastened to the bench. A rib 1, of similar material, preferably bent and machined to shape and softened with solvent or coated with adhesive, is located against the inside of the lower edge of the shell 2. Expanding members 5, each having one edge conforming to the curvature of the joint, are placed in position, free to move upon the surface of the bench, and the wedge 6, constituting the central pressure element, is inserted in the V-shaped space between the two members. Pressure applied to the wedge 6 by means of thumb screws 7, engaged by threads with brace 8, which latter is fastened to bench, advances the wedge 6 in a direction median to the curve of the joint and forces the two expanding members 5 forwardly and outwardly, so that the pressure is transmitted to the cemented surfaces in directions everywhere normal to the joint.

It is preferred that the stops 3, which together constitute a negative form, be constructed of transparent material, so that the joint will be visible from without during the cementing operation. Organic plastic material is ideally suited to this use. All stops may be arranged exactly on the curve, as shown, or alternate stops may be slightly recessed to permit the driving of a wooden wedge between the stop and the shell to repair fortuitous local pressure deficiencies due to irregularities in the shape of the cemented parts. For clarity in the drawings only a few stops 3 are shown but in actual fact many more would normally be used.

Wood is the favored material for the expanding members 5 and the wedge 6, although other materials may be used. The broad end of the wedge 6 may be provided with a metal plate 9, to reduce wear due to the action of the thumb screws.

This device constitutes an efficient means for applying uniform pressure without marring to curved mating parts during cementing and for maintaining that pressure as long as is required for the proper strengthening of the bond. It permits the formation of strong bubble-free bonds between curved organic plastic structures.

A suitably shaped jig may be used in cementing a rib to any part of a curved object. If desired, a series of jigs properly positioned may be employed to secure a series of ribs to a shell or similar structure simultaneously at different levels.

Referring to Figs. 4, 5 and 6—A, 6—B, and 6—C, another embodiment of the invention is illustrated. The pressure jig comprises expanding members 15 actuated by threaded central pressure element 16 engaging the threaded core of collar 19 which is rigidly attached to cross piece 17. The cross piece 17, which consists of a channel iron, is provided on each end with ears 20 and notches 23. The central pressure element 16 is furnished at the top with a wheel 13 keyed thereto or otherwise prevented from independent rotation. Only the upper portion of the central element 16 need be threaded. The lower portion is equipped with alternate series of fixed collars 24, burnished or shrunken thereon, loose collars 25, washers 26, and springs 27. The loose collars 25, free to move up and down the central pressure element 16 except as restricted by the fixed collars 24 and springs 27, are attached to one end of connecting links 18 by pairs of metal straps 25—a and cooperating bolts 25—b. The metal straps 25—a bind tightly on the loose collars 25 and remain in fixed relation thereto. At the opposite end each link 18 is pivotally attached to a lug 28 fastened to the inner surfaces of the expanding members 15. The outer surfaces of the expanding members 15 bear a groove 14 which mates with the plastic rib 12 (see Fig. 6), in the cementing operation.

The expanding members 15 are attached to the cross piece 17 by L-shaped brackets 29 provided with slotted openings 30 and 30—a. For clarity of illustration the cross piece 17 is shown in Fig. 4 as slightly separated from the expanding member 15 but it will be understood that bolts fixed in the cross piece 17 will be passed through the slotted openings 30 in the brackets 29 just as the bolts 30—b fixed in the expanding members 15 pass through the slotted openings 30—a (see the right hand member 15 in Fig. 4). By this arrangement the members 15 are permitted a limited movement both toward and from the cross piece 17 and, also, along the longitudinal axis of the cross piece 17.

At their lower ends the members 15 are preferably joined by a slotted bar 31 cooperating with pins 32 carried by the members 15; this construction permits limited relative lateral movement of the members 15 in a plane including the two.

The formed shell 10 is first introduced into fixture 11 (see Figs. 5 and 6). Rib 12, already curved and machined to shape, and softened or coated with cement, is then inserted in the shell 10 and adjusted to the desired position. The pressure jig is next lowered into place, with the ears 20 slipping over diametrically opposed portions 21 of the fixture. Clamps 22 engage notches 23 at the ends of the cross piece 17 firmly securing the jig to the frame.

Progressively advancing the screw element 16 in collar 19 lowers that portion of the element to which the connecting rods are attached. Fixed collars 24 bear upon loose collars 25, forcing the connecting links 18 and the expanding members 15 downward and outward. The relative positions of the various parts of the pressure jig are carefully adjusted so that the pressure of the central screw element 16 is transmitted everywhere substantially normal to the curvature of the joint.

Washers 26 and springs 27 serve to hold loose collars 25, in position against fixed collars 24. They may be replaced by another set of collars rigidly fixed upon the screw element 16 just below the loose collars 25.

In either embodiment of the invention, the rib is preferably shaped prior to being introduced into the shell. The rib may, however, be taken in a crudely shaped or completely unshaped state and, having been softened by heat or solvent, forced into the proper configuration by means of the pressure jig. To this use the type of jig shown in Figs. 4 and 6—A is particularly adapted, for the groove in the expanding members 15 mates with the rib and holds it from lateral displacement.

By suitable modifications of either type of jig, strengthening parts can be cemented to an external surface of a shell with equal facility.

Two specific embodiments of the invention have been illustrated in the drawings but the invention is not limited to these specific forms and more broadly resides in an apparatus for cementing together a pair of curved mating parts of plastic material which apparatus includes a limiting fixture having an inner edge conforming to the curvature of the outer mating part along the line of the joint to be made with the inner mating part, a pair of expanding members each having an outer edge conforming to the curvature of the inner mating part along the line of the joint, together with a central pressure element adapted to displace the expanding members laterally and forwardly to apply, in cooperation with the limiting fixture, pressure substantially uniformly along the line of the joint.

It will be understood that the apparatus of the present invention is perfectly well adapted for cementing together mating parts where the line of the joint includes straight portions in the curve and it is intended that the term "curved mating parts" shall include curves of this type as well as continuous curves.

The herein disclosed apparatus is suitable for cementing parts of any plastic material and is especially well adapted for cementing parts of thermoplastic material such as polymethyl methacrylate, cellulose acetate, and the like.

The present invention provides an apparatus for effecting strong, bubble-free joints between curved mating parts of plastic material. The advantages of the invention are especially apparent in cementing operations involving airplane structures of transparent organic plastic material where the requirements of high optical quality, adequate strength, and trim appearance must be made on difficult shapes of easily marred material.

As many apparently widely different embodiments of this invention may be made without departing from the spirit and scope thereof, it is to be understood that the invention is not limited to the specific embodiments thereof except as defined in the appended claims.

I claim:

1. An apparatus for cementing together a pair of curved mating parts of plastic material which apparatus comprises a limiting fixture having an inner edge conforming to the curvature of the outer mating part along the line of the joint to be made with the inner mating part, and a jig including a cross-piece, a pair of rigid expanding members slidably connected to each other at one end to permit lateral movement relative to each other in a plane including both, and slidably connected at the opposite ends to spaced points along said cross piece to permit a combined lateral movement relative to each other in said plane including both and a forward movement with respect to the longitudinal axis of said cross piece, and means mounted on said cross piece for displacing said expanding members laterally and forwardly to apply, in cooperation with said limiting fixture, pressure substantially uniformly along the line of said joint.

2. An apparatus for cementing together a pair of curved mating parts of plastic material which apparatus comprises a limiting fixture having an inner edge conforming to the curvature of the outer mating part along the line of the joint to be made with the inner mating part, and a jig including a cross piece, a pair of rigid expanding members slidably connected to each other at one end to permit lateral movement relative to each other in a plane including both, and slidably connected at the opposite ends to spaced points along said cross piece to permit a combined lateral movement relative to each other in said plane including both and a forward movement with respect to the center of said cross piece, a screw member threadably mounted in said cross piece and extending therefrom in said plane including said expanding members toward the point of connection of the ends of said expanding members to each other, a spaced series of pairs of links, each pair being connected to said screw member on opposite sides thereof adjacent said expanding members and each link of said pair being pivotally connected to its adjacent expanding member, and means for turning said screw member in its threaded mounting in said cross piece to displace through said links said expanding members laterally and forwardly to apply, in cooperation with said limiting fixture, pressure substantially uniformly along the line of said joint.

3. An apparatus for cementing together a pair of curved mating parts of plastic material which apparatus comprises a limiting fixture having an inner edge conforming to the curvature of the outer mating part along the line of the joint to be made with the inner mating part, and a jig including a cross piece, a pair of rigid expanding members slidably connected to each other at one end to permit lateral movement relative to each other in a plane including both, and slidably connected at the opposite ends to spaced points along said cross piece to permit a combined lateral movement relative to each other in said plane including both and a forward movement with respect to the center of said cross piece, a screw member threadably mounted in said cross piece and extending therefrom in said plane including said expanding members toward the point of connection of the ends of said expanding members to each other, a spaced series of pairs of links, each pair being connected to said screw member on opposite sides thereof adjacent said expanding members and each link of said pair being pivotally connected to its adjacent expanding member at a point more distant from said cross-member than the point of attachment of said link to said screw member, and a wheel mounted on said screw member for turning said screw member in its threaded mounting in said cross piece to displace through said links said expanding members laterally and forwardly to apply, in cooperation with said limiting fixture, pressure substantially uniformly along the line of said joint.

4. An apparatus for cementing together a pair of curved mating parts of plastic material which apparatus comprises a limiting fixture having an inner edge conforming to the curvature of the outer mating part along the line of the joint to be made with the inner mating part, a pair of rigid expanding members each having an outer edge extending approximately half way along the line of said joint, said members being so positioned and shaped that said outer edges present substantially a continuous face conforming to the curvature of the inner mating part along the line of said joint and abutting against said inner mating part along the line of said joint, and a central pressure element adapted to displace said expanding members laterally and forwardly to apply, in combination with said limiting fixture, pressure substantially uniformly along the line of said joint.

5. An apparatus for cementing together a pair of curved mating parts of plastic material which apparatus comprises a plurality of fixed stops arranged in a curve conforming to the curvature of the outer mating part along the line of the joint to be made with the inner mating part, a pair of rigid expanding members each having an outer edge extending approximately half way along the line of said joint, said members being so positioned and shaped that said outer edges present a substantially continuous face conforming to the curvature of the inner mating part along the line of said joint and abutting against said inner mating part along the line of said joint and a wedge positioned between said pair of expanding members and adapted to be driven forward to displace said expanding members laterally and forwardly to apply, in cooperation with said fixed stops, pressure substantially uniformly along the line of said joint.

PAUL F. PRESTON.